Patented June 30, 1925.

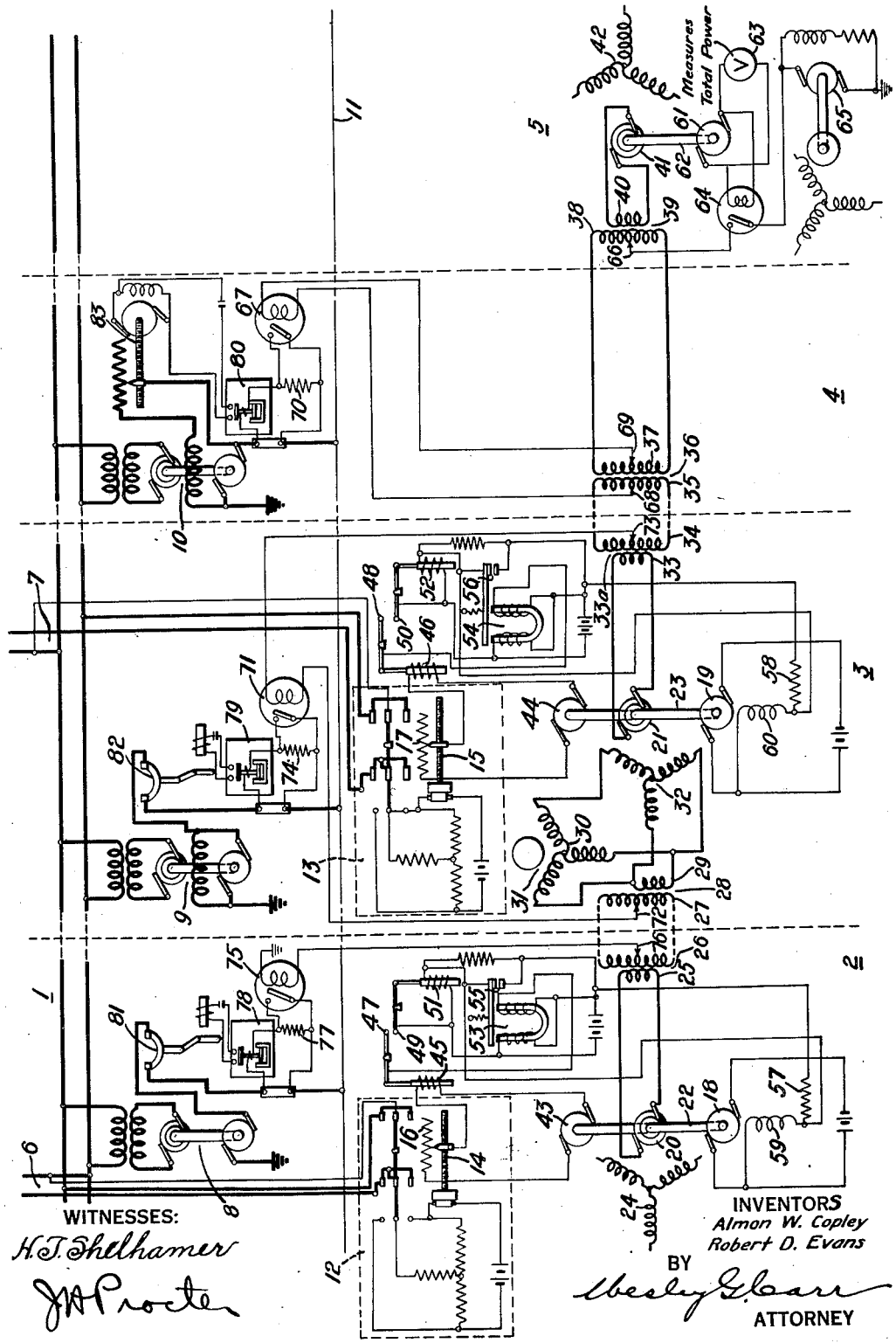

1,543,697

UNITED STATES PATENT OFFICE.

ALMON W. COPLEY AND ROBERT D. EVANS, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF DISTRIBUTION.

Application filed November 7, 1917, Serial No. 200,664. Renewed September 30, 1924.

*To all whom it may concern:*

Be it known that we, ALMON W. COPLEY, a citizen of the United States, and a resident of Wilkinsburg, in the county of Allegheny and State of Pennsylvania, and ROBERT D. EVANS, a citizen of the United States, and a resident of Wilkinsburg, in the county of Allegheny and State of Pennsylvania, have invented a new and useful Improvement in Systems of Distribution, of which the following is a specification.

Our invention relates to systems of distribution and particularly to measuring and controlling devices for such systems.

One object of our invention is to provide means for limiting the power input into a distributing circuit when the total power supplied to its supply circuit, at widely separated points, exceeds a predetermined value.

Another object of our invention is to provide means for selectively limiting the output of transforming means that are connected between the supply and distributing circuits of a system of the above indicated character.

Another object of our invention is to provide means whereby the sum of the power supplied to a circuit, at widely separated points, may be indicated through a single-phase transmission circuit, at any desired point, without the errors heretofore incidental to transmission losses.

A further object of our invention is to provide a system of the above indicated character that shall be simple and effective in its operation.

Copending application Serial No. 200,034, filed November 3, 1917, by Robert D. Evans and assigned to the Westinghouse Electric and Manufacturing Company, discloses a system of generating voltages having frequencies proportional to the energy supplied to a supply circuit and means for combining the frequencies of the various voltages for the purpose of indicating a value that is proportional to the summation of the power to be measured. Such systems require a polyphase transmission system.

In our present invention, we utilize the broad principle set forth in the above indicated application and transmit the voltages by a single-phase transmission system. This ordinarily would not be feasible and, in view of this, we utilize phase converters to transform the single-phase voltages to polyphase voltages at the various dynamos. We further provide means whereby, when the total power supplied to the supply circuit exceeds a predetermined value, a continuous current will be transmitted through the measuring system to co-operate with inverse time-limit relays to cause the load on the various sub-stations of the circuit to be successively reduced in a predetermined order.

The single figure of the accompanying drawing is a diagrammatic view of a system of distribution embodying our invention.

A supply circuit 1 connects stations 2, 3, 4 and 5 and is provided, at predetermined points, with feeder circuits 6 and 7 for supplying power thereto. The stations 2, 3, and 4 may be considered sub-stations and are provided with transforming devices 8, 9 and 10, such as motor-generator sets. The motor-generator sets 8, 9 and 10 are connected between the supply circuit 1 and a distributing circuit 11.

Kelvin balances or other power-responsive devices 12 and 13 are adapted to measure the power supplied by the feeder circuits 6 and 7, respectively, to the supply circuit 1 and are adapted to control movable contact members 14 and 15 that engage resistors 16 and 17, respectively. The positions of the contact members 14 and 15, with respect to the resistors 16 and 17, so control the speed of motors 18 and 19 and dynamos 20 and 21, which are mounted on shafts 22 and 23 with the motors 18 and 19, respectively, that voltages are induced in the secondary windings of the same which vary in accordance with the power traversing the circuits 6 and 7, respectively.

The primary winding 24 of the dynamo 20 is operatively connected to a source of direct-current or to a source of alternating-current electromotive force having a known frequency. The secondary winding of the dynamo 20 is connected to the primary winding 25 of a transformer, the secondary winding 26 of which is connected to the primary winding 27 of a transformer 28 in the sub-station 3. The secondary winding 29 of the transformer 28 is connected to the stator windings 30 of a phase-converter 31 and to the primary winding 32 of the dynamo 21. The secondary winding of the dynamo 21 is connected to the primary winding 33 of a transformer 33ª, the secondary winding 34 of which is connected to the primary winding 35 of the transformer 36 in the sub-station 4. The secondary winding 37 of the transformer 36 is connected to the primary winding 38 of a transformer 39 in the despatcher or control station 5. The secondary winding 40 of the transformer 39 is connected to the secondary winding of a motor 41 the primary winding 42 of which is connected to a source of direct-current or a source of alternating-current electromotive force having a known frequency, preferably the same as that of the electromotive force applied to the primary winding 24 of the dynamo 20.

Magnetos 43 and 44 are mounted on the shafts 22 and 23, respectively, and are adapted to be connected, through the windings of electromagnets 45 and 46, to the resistors 16 and 17, respectively. The electromagnets 45 and 46 are adapted to control contact members 47 and 48 that co-operate with contact members 49 and 50 for the purpose of controlling the motors 18 and 19. The contact members 49 and 50 are periodically actuated by electromagnets 51 and 52 as is the usual practice in voltage regulators. Relays 53 and 54 are adapted to be controlled by the contact members 47 and 49 and 48 and 50 for the purpose of actuating contact members 55 and 56 that control the insertion of resistors 57 and 58 in the circuits of the respective field windings 59 and 60 of the motors 18 and 19.

Since a voltage having a known frequency is applied to the winding 24 of the dynamo 20, the voltage applied to the primary winding 32 of the dynamo 21 will be equal to the sum of the frequency of the voltage applied to the winding 24 and the frequency of the voltage generated by the dynamo 20 by reason of its rotation. Similarly, the frequency applied to the primary winding 38 of the transformer 39 will be equal to the sum of the frequency of the voltage applied to the winding 24 and that generated by the dynamos 20 and 21 by reason of their rotation. Since, for purposes of illustration, polyphase voltage of known frequency is applied to the primary winding 42 of the motor 41, and the frequency of the voltage applied to the secondary winding of the motor 41 is equal to the sum of the applied frequency and the frequency generated, by reason of the rotation of the dynamos 20 and 21, the motor 41 will be actuated at a speed directly proportional to the summation of the frequencies generated by reason of the rotation of the dynamos 20 and 21 and the frequency of the voltage applied to the winding 24 less the frequency of the voltage applied to the winding 42. If the frequencies of the voltages applied to the winding 24 of the dynamo 20 and the winding 42 of the motor 41 are equal or, if direct current is applied thereto, the speed of rotation of the motor 41 will be proportional to the sum of the speeds of the dynamos 20 and 21, and, consequently, a direct-current generator 61 that is mounted upon the shaft 62 with the motor 41 will generate a voltage proportional to the power supplied to the circuit 1 from the feeder circuits 6 and 7. A voltmeter 63 may be connected across the terminals of the generator 61 to indicate the summation of the power supplied to the circuit 1.

As it is desirable to always keep the dynamos 20 and 21 rotating even when no energy traverses the feeder circuits 6 and 7, the regulating relays may be adjusted for a definite speed to correspond to the no-load condition and the change of speed above this value will then be proportional to the power supplied. If power is regenerated, the dynamos will be retarded and their speeds reduced below the no-load speed. The motor 41 will, in this case, run at a speed that is the summation of the speeds of dynamos 20 and 21 including the no-load speeds Therefore, the sum of the no-load speeds must be subtracted from the speed of the motor 41, the remainder being proportional to the total net power supplied to the system.

A relay 64 is operatively connected across the terminals of the generator 61 and is adapted to control a circuit from a source 65 of direct current to the mid point 66 of the primary winding 38 of the transformer 39. A relay 67 is connected across mid points 68 and 69 of the windings 35 and 37 of the transformer 36 and is adapted to short circuit a resistor 70 when the total power supplied from the circuit 1 exceeds a predetermined value, as indicated by the meter 63, or, in other words, when the relay 64 is actuated. Similarly, a relay 71 is connected between the mid point 72 of the winding 27 of the transformer 28 and the mid point 73 of the secondary winding 34 of the transformer 33ª. The relay 71 is adapted to short circuit a resistor 74 under similar predetermined conditions. A relay 75 is connected from ground to the mid point 76 of the secondary winding 26. The relay 75 is adapted to short circuit a resistor 77, under predetermined conditions.

Relays 78, 79 and 80 are connected to the current shunts of the generators of the motor-generator sets 8, 9 and 10, respectively, and in series with the respective resistors 77, 74 and 70. The relays 78, 79 and 80 are adapted to operate at the end of a time interval that will vary inversely as the current traversing the same after the respective resistors 77, 74 and 70 have been short circuited varies. Thus, when the energy supplied to the circuit 1 exceeds a predetermined value, the relays 78, 79 and 80 are energized and the one connected to the sub-station that is supplying the greatest amount of energy to the circuit 11 is actuated first to either disconnect the sub-station from the circuit 11 or to reduce the voltage of, and, consequently, the load on, the sub-station. If the total amount of energy supplied to the circuit 1 is not reduced after the first sub-station is either disconnected or the energy output of the same is decreased, the next most highly loaded sub-station will be disconnected, and, similarly, each sub-station will be disconnected or its power output limited in accordance with the load traversing the same, so long as the energy supplied to the circuit 1 exceeds a predetermined value.

Circuit interrupters 81 and 82 have been provided in the sub-stations 2 and 3 as illustrative of means for disconnecting the generators from the circuit 11 when the power supplied to the circuit 1 exceeds a predetermined value and a motor-operated rheostat 83 is provided in sub-station 4 as illustrative of means for reducing the voltage of the generator when the power supplied to the circuit 1 exceeds a predetermined value. Since the relay that is connected to the most heavily loaded generator will operate first, the proper sequence in either disconnecting or reducing the voltage of the generators is insured.

Since the frequency of the voltage generated by the dynamos 20 and 21 and transmitted through the various transformers of the measuring system is independent of the electrical characteristics of the circuit changes in temperature, resistance and leakage of the conductors does not affect the indications, and the system will be accurate under all conditions.

In a divisional application, Serial No. 641,872, filed May 28, 1923 and assigned to the Westinghouse Electric and Manufacturing Company, relating to the same subject matter as described in the present application, we have embodied claims relating to the regulating features of the present system.

Our invention is not limited to the particular devices illustrated, as various modifications may be made therein without departing from the spirit and scope of the invention as set forth in the appended claims.

We claim as our invention:

1. In a distribution system, the combination with a plurality of feeder circuits, of a plurality of polyphase dynamos actuated to generate electromotive forces having frequencies varying in accordance with the power traversing the respective feeder circuits, means comprising a single-phase transmission line for connecting the dynamos together, phase-converting means interposed between the primary winding of one dynamo and the secondary winding of the next, and means for indicating the resultant frequency of the various dynamos.

2. The combination with a plurality of measuring devices, of a plurality of polyphase dynamos actuated to generate electromotive forces having frequencies varying in accordance with the power measured by the measuring devices, means comprising a single-phase transmission line for connecting the dynamos, phase-converting means between the single-phase connecting means and the primary windings of the dynamos, and means actuated in accordance with the resultant frequency of the dynamos.

3. The combination with a plurality of dynamos having polyphase primary and single-phase secondary windings for measuring a plurality of similar quantities, of means for actuating the respective dynamos to generate electromotive forces having frequencies varying in accordance with the values of the respective quantities to be measured, means comprising a single phase transmission line for connecting the dynamos, means for operatively connecting the single-phase transmission line to the polyphase primary windings of the dynamos, and means for indicating the resultant frequency of the dynamos.

4. A summation measuring system comprising a plurality of dynamos having polyphase primary and single-phase secondary windings for generating electromotive forces having varying frequencies, means comprising a single-phase transmission line for operatively connecting the dynamos together and means for indicating the resultant of the several frequencies generated in the system.

5. In a measuring system, the combination with a plurality of power-measuring devices, of polyphase dynamos actuated to generate electro-motive forces having frequencies varying in accordance with the indications of the respective measuring devices, means comprising a single-phase transmission line for operatively connecting the dynamos in cascade and means actuated in accordance with the resultant of the several frequencies generated in the system.

6. In a measuring system, the combination with a plurality of power-measuring devices, of dynamos having polyphase primary and single-phase secondary windings actuated to generate electromotive forces having frequencies varying in accordance with the indications of the respective measuring devices, phase converters for connecting the primary winding of one dynamo to the secondary winding of the next, and frequency-responsive means actuated in accordance with the resultant frequency of the system.

7. In a distribution system, the combination with a plurality of feeder circuits, of a plurality of polyphase dynamos, means comprising a single-phase transmission line for connecting the same together, means for actuating the said dynamos in accordance with the power traversing the respective feeder circuits to generate electromotive forces having frequencies varying in accordance with the power traversing the circuits, phase-converting means interposed between the primary winding of one dynamo and the secondary winding of the next, and a motor actuated in accordance with the resultant frequency of the voltages developed by the various dynamos.

8. In a measuring system, the combination with a plurality of power-measuring devices in stations remotely disposed with respect to each other, of a plurality of polyphase dynamos driven at a speed proportional to the power measured by the respective measuring devices, a single-phase transmission line between consecutive stations for connecting the rotor windings of the dynamo in one station to the stator windings of the dynamo in the next station, phase-converting means connected between the transmission line and the windings of the latter dynamo and means for measuring the frequency of the electromotive force produced by the rotor windings of the dynamo in the last station.

9. In a measuring system, the combination with a plurality of power-measuring devices in stations remotely disposed with respect to each other, of means in one station for producing an electromotive force having a frequency responsively varying in proportion to the power measured by the measuring device, a single-phase transmission line between that station and the next station, means in that station influenced by the frequency of the eelctromotive force of the first station, means cooperating with the frequency-influenced means and simultaneously responsive to said means and to the variation of the power measured in that station for producing an electromotive force having a frequency equal to the sum of the frequency of the first station and the electrical speed of the power-responsive means in the second station and means for indicating the summation of the frequencies.

10. In a measuring system, the combination with a plurality of feeder circuits in stations remotely disposed with respect to each other, of means for generating electromotive forces having frequencies varying in proportion to the power traversing the respective circuits, means comprising a single-phase transmission line between the several stations for connecting the generating means together to subject said means in one station to the frequency of the electromotive force generated by the corresponding means in the preceding station and means for measuring the resultant frequency of the generating means in one of the stations.

11. In a measuring system, the combination with a plurality of measuring devices, of a plurality of dynamos having polyphase primary and single-phase secondary windings, a single-phase circuit between the secondary winding of one dynamo and the polyphase winding of another dynamo, and means operatively connected between the single-phase circuit and the polyphase winding to produce a revolving magnetic field effect by means of the polyphase windings.

In testimony whereof, we have hereunto subscribed our names this 23rd day of Oct., 1917.

ALMON W. COPLEY.
ROBERT D. EVANS.